(12) United States Patent
James et al.

(10) Patent No.: US 11,485,209 B2
(45) Date of Patent: Nov. 1, 2022

(54) ADJUSTABLE GLASS TRACK SYSTEMS FOR VEHICLES WITH FRAMELESS DOORS

(71) Applicant: FORD GLOBAL TECHNOLOGIES, LLC, Dearborn, MI (US)

(72) Inventors: Sara E. James, Commerce Township, MI (US); Corey A. Griewahn, Milford, MI (US); Craig S. Pearson, Northville, MI (US); Bing Jiang, Lasalle (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 16/914,985

(22) Filed: Jun. 29, 2020

(65) Prior Publication Data
US 2021/0402859 A1 Dec. 30, 2021

(51) Int. Cl.
*B60J 10/777* (2016.01)
*B60J 10/90* (2016.01)
(Continued)

(52) U.S. Cl.
CPC .......... *B60J 10/7775* (2016.02); *B60J 10/21* (2016.02); *B60J 10/84* (2016.02); *B60J 10/90* (2016.02);
(Continued)

(58) Field of Classification Search
CPC ... B60J 10/21; B60J 10/24; B60J 10/27; B60J 10/40; B60J 10/45; B60J 10/77; B60J 10/84; B60J 10/90; B60J 10/265; B60J 10/7775; B60J 5/04; B60J 5/0412; B60J 5/0418; B60J 5/0419; B60J 1/08; B60J 1/16; B60J 1/17; B60R 13/04;
(Continued)

(56) References Cited

U.S. PATENT DOCUMENTS

| | | | | |
|---|---|---|---|---|
| 1,752,511 A | * | 4/1930 | Smith | B60J 1/17 49/323 |
| 5,495,693 A | * | 3/1996 | Tiesler | B60J 1/17 296/146.3 |

(Continued)

FOREIGN PATENT DOCUMENTS

| | | | |
|---|---|---|---|
| DE | 19926474 A1 | * 12/2000 | B60J 1/183 |
| EP | 0618101 B1 | 4/1997 | |

(Continued)

OTHER PUBLICATIONS

Kuroda et al., "Seal Device for Vehicle Having Convertible Top", May 13, 1986, Edition: JPS6194816A (Year: 1986).*

(Continued)

*Primary Examiner* — Dennis H Pedder
*Assistant Examiner* — Joyce Eileen Hill
(74) *Attorney, Agent, or Firm* — Vichit Chea; Carlson, Gaskey & Olds, P.C.

(57) ABSTRACT

This disclosure details exemplary adjustable glass track systems for vehicles. In some embodiments, the glass track systems may establish a continuous sealing plane relative to a glass pane of a frameless door. In other embodiments, the glass track systems may additionally establish a continuous sealing plane relative to a vehicle roof structure. Exemplary adjustable glass track systems may include, among other features, a tubular frame rail, a channel rail, appliques, and seals.

20 Claims, 8 Drawing Sheets

(51) Int. Cl.
*B60J 10/84* (2016.01)
*B60J 10/21* (2016.01)
*B60J 5/04* (2006.01)
*B60J 1/08* (2006.01)
*B60J 1/16* (2006.01)
*B60J 1/17* (2006.01)
*B60R 13/04* (2006.01)
*E05D 15/16* (2006.01)
*B62D 29/00* (2006.01)

(52) U.S. Cl.
CPC ............ *B60R 13/04* (2013.01); *B62D 29/008* (2013.01); *E05D 15/165* (2013.01); *B60J 1/08* (2013.01); *B60J 1/16* (2013.01); *B60J 1/17* (2013.01); *B60J 5/04* (2013.01); *B60J 5/0419* (2013.01); *E05Y 2900/531* (2013.01)

(58) Field of Classification Search
CPC .... B62D 29/008; B62D 25/04; E05D 15/165; E05Y 2900/531
USPC ...... 296/146.15, 146.16, 146.2, 216.04, 147, 296/146.3
See application file for complete search history.

(56) References Cited

U.S. PATENT DOCUMENTS

| | | | | |
|---|---|---|---|---|
| 5,738,405 | A * | 4/1998 | Richters | B60J 1/085 296/146.15 |
| 6,428,090 | B1 * | 8/2002 | Reinsch | B60J 7/0053 296/219 |
| 6,886,881 | B1 * | 5/2005 | Henderson | B60J 1/08 296/146.2 |
| 7,871,120 | B2 * | 1/2011 | Dietz | B60J 10/32 296/146.9 |
| 8,328,975 | B2 * | 12/2012 | Ruppert | B60J 10/78 264/261 |
| 8,991,896 | B1 * | 3/2015 | Whitehead | B60J 7/106 296/121 |
| 9,114,765 | B1 * | 8/2015 | James | B60R 13/04 |
| 9,248,862 | B1 * | 2/2016 | Redmer | B62D 25/04 |
| 10,029,544 | B2 * | 7/2018 | Kramar | E06B 3/42 |
| 10,035,408 | B2 * | 7/2018 | Crismon | B60J 7/106 |
| 10,286,769 | B2 * | 5/2019 | Kuwabara | B60J 10/84 |
| 10,549,618 | B2 | 2/2020 | Kuwabara et al. | |
| 2008/0100093 | A1 * | 5/2008 | Seiple | B60J 1/1853 296/146.16 |
| 2012/0091751 | A1 * | 4/2012 | Zimmer | B60J 5/0402 296/146.9 |
| 2013/0292965 | A1 * | 11/2013 | Prater | B60J 10/76 29/428 |
| 2015/0165880 | A1 * | 6/2015 | Mass | B60J 10/20 49/490.1 |
| 2015/0315666 | A1 * | 11/2015 | Harrison | B21D 7/16 148/567 |

FOREIGN PATENT DOCUMENTS

GB 2566302 A 3/2019
JP 61094816 A * 5/1986 ............. B60J 10/90

OTHER PUBLICATIONS

Minatti, "High construction private motor vehicle has state in which with folding top box located on level with closed roof the vehicle presents closed structure and even in this raised position of folding top is functional and drivable", Dec. 14, 2000, Edition: DE19926474A1 (Year: 2000).*

* cited by examiner

ADJUSTABLE GLASS TRACK SYSTEMS FOR VEHICLES WITH FRAMELESS DOORS

TECHNICAL FIELD

This disclosure relates to adjustable glass track systems for establishing continuous seal planes relative to glass panels and other vehicle structures.

BACKGROUND

Some vehicles include door assemblies and/or roof structures that include components that can be either opened or removed from the vehicle to provide an open air riding experience. Sealing relative to these types of movable/removable components can be challenging.

SUMMARY

An adjustable glass track system for a vehicle according to an exemplary aspect of the present disclosure includes, among other things, a tubular frame rail, a channel rail mounted relative to the tubular frame rail, a first seal secured to the channel rail, an applique secured to the channel rail, and a second seal mounted to the applique.

In a further non-limiting embodiment of the foregoing system. the tubular frame rail is a hydroformed aluminum tube and is a structural member of a roof of the vehicle.

In a further non-limiting embodiment of either of the foregoing systems, the channel rail is mounted to the tubular frame rail by a rail bracket.

In a further non-limiting embodiment of any of the foregoing systems, the channel rail includes a first flange mounted to the rail bracket by a locator pin and a second flange that receives the first seal.

In a further non-limiting embodiment of any of the foregoing systems, the applique includes a side flange that receives the second seal.

In a further non-limiting embodiment of any of the foregoing systems, the applique includes a locating hook received within a slot formed in the channel rail.

In a further non-limiting embodiment of any of the foregoing systems, the applique is mounted to the channel rail by a fastener.

In a further non-limiting embodiment of any of the foregoing systems, the channel rail extends between a first pillar and a second pillar, and further comprising a third seal mounted to the first pillar.

In a further non-limiting embodiment of any of the foregoing systems, the first seal is configured to seal relative to a top peripheral edge of a glass pane, and the second seal is configured to seal relative to an inner side peripheral edge of the glass pane.

In a further non-limiting embodiment of any of the foregoing systems, the first seal and the second seal meet together at a corner between the channel rail and the applique to establish a continuous seal plane that follows a path around the corner.

A vehicle according to another exemplary aspect of the present disclosure includes, among other things, a door assembly including a frameless door and a frameless window. A glass pane of the frameless window is movable between an open position in which the glass pane is positioned inside an interior cavity of the frameless door and a closed position in which the glass pane extends outside of the interior cavity. An adjustable glass track system is configured to establish a continuous seal plane about a periphery of the glass pane when the glass pane is in closed position.

In a further non-limiting embodiment of the foregoing vehicle, the door assembly is a front door assembly or a rear door assembly of the vehicle.

In a further non-limiting embodiment of either of the foregoing vehicles, the adjustable glass track system includes a tubular frame rail, a channel rail mounted to the tubular frame rail by a rail bracket, a first seal secured to the channel rail, a first applique secured to the channel rail, and a second seal mounted to the first applique.

In a further non-limiting embodiment of any of the foregoing vehicles, the first applique is mounted to a first pillar of the vehicle, and comprising a second applique mounted to a second pillar of the vehicle, and further comprising a second, second seal mounted to the second applique.

In a further non-limiting embodiment of any of the foregoing vehicles, the first seal extends between the first pillar and the second pillar, and comprising a second, first seal extending between the second pillar and a third pillar.

In a further non-limiting embodiment of any of the foregoing vehicles, a third seal is mounted to the third pillar.

In a further non-limiting embodiment of any of the foregoing vehicles, together, the first seal, the second seal, and the second, second seal establish the continuous seal plane.

In a further non-limiting embodiment of any of the foregoing vehicles, the channel rail includes a first flange mounted to the rail bracket by a locator pin and a second flange that receives the first seal. The first applique includes a side flange that receives the second seal.

In a further non-limiting embodiment of any of the foregoing vehicles, the adjustable glass track system is configured to establish a second seal plane relative to an inner peripheral edge of a removable roof structure.

In a further non-limiting embodiment of any of the foregoing vehicles, the removable roof structure is a soft top roof structure or a hard top roof structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary adjustable glass track systems for vehicles. In some embodiments, the glass track systems may establish a continuous sealing plane relative to a glass pane of a frameless door. In other embodiments, the glass track systems may additionally establish a continuous sealing plane relative to a vehicle roof structure. Exemplary adjustable glass track systems may include, among other features, a tubular frame rail, a channel rail, appliques, and seals. These and other features of this disclosure are described in greater detail below.

Figure 1:
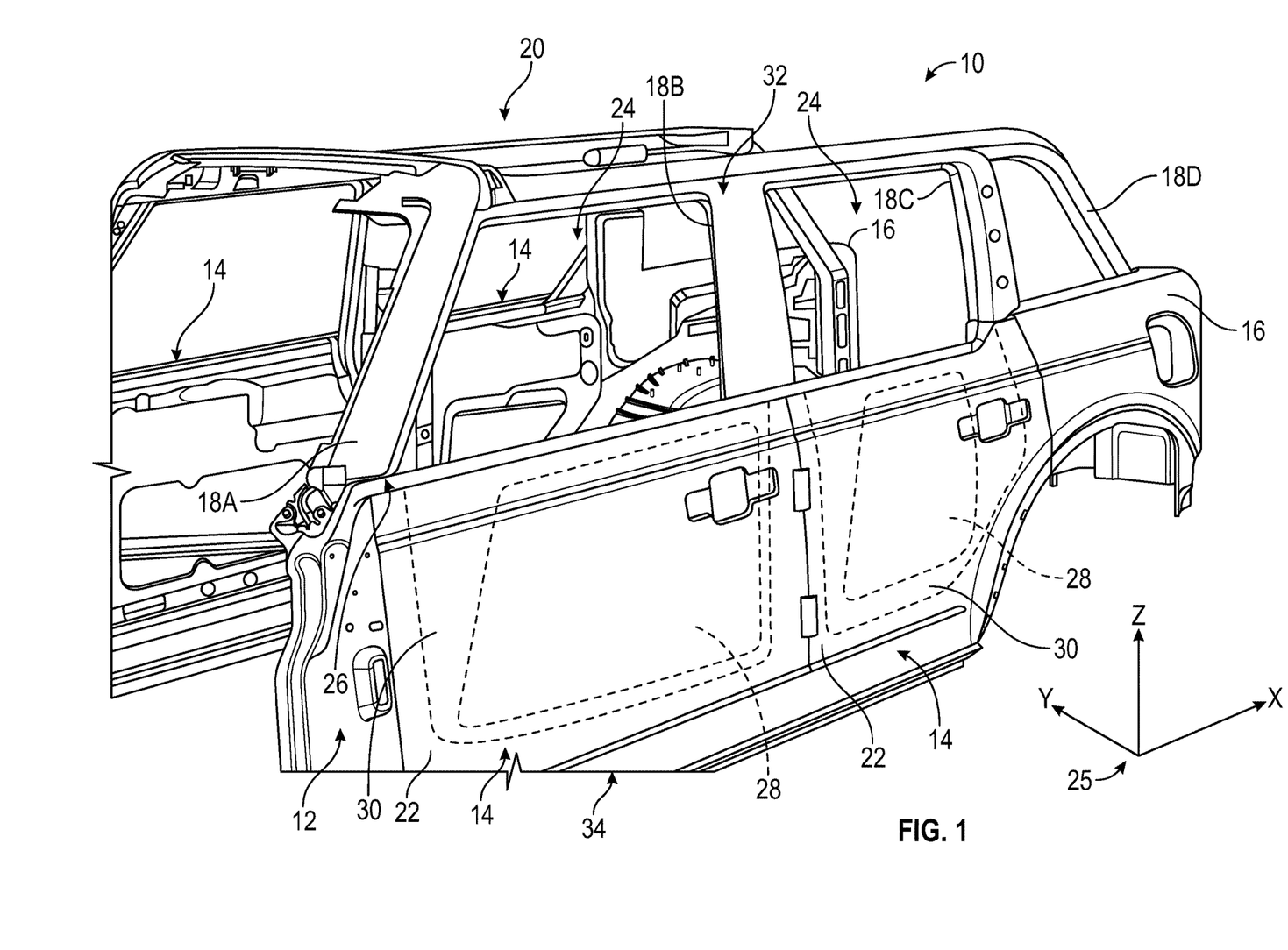
FIG. 1 is a driver-side view of a vehicle equipped with an adjustable glass track system.
Figure 2:
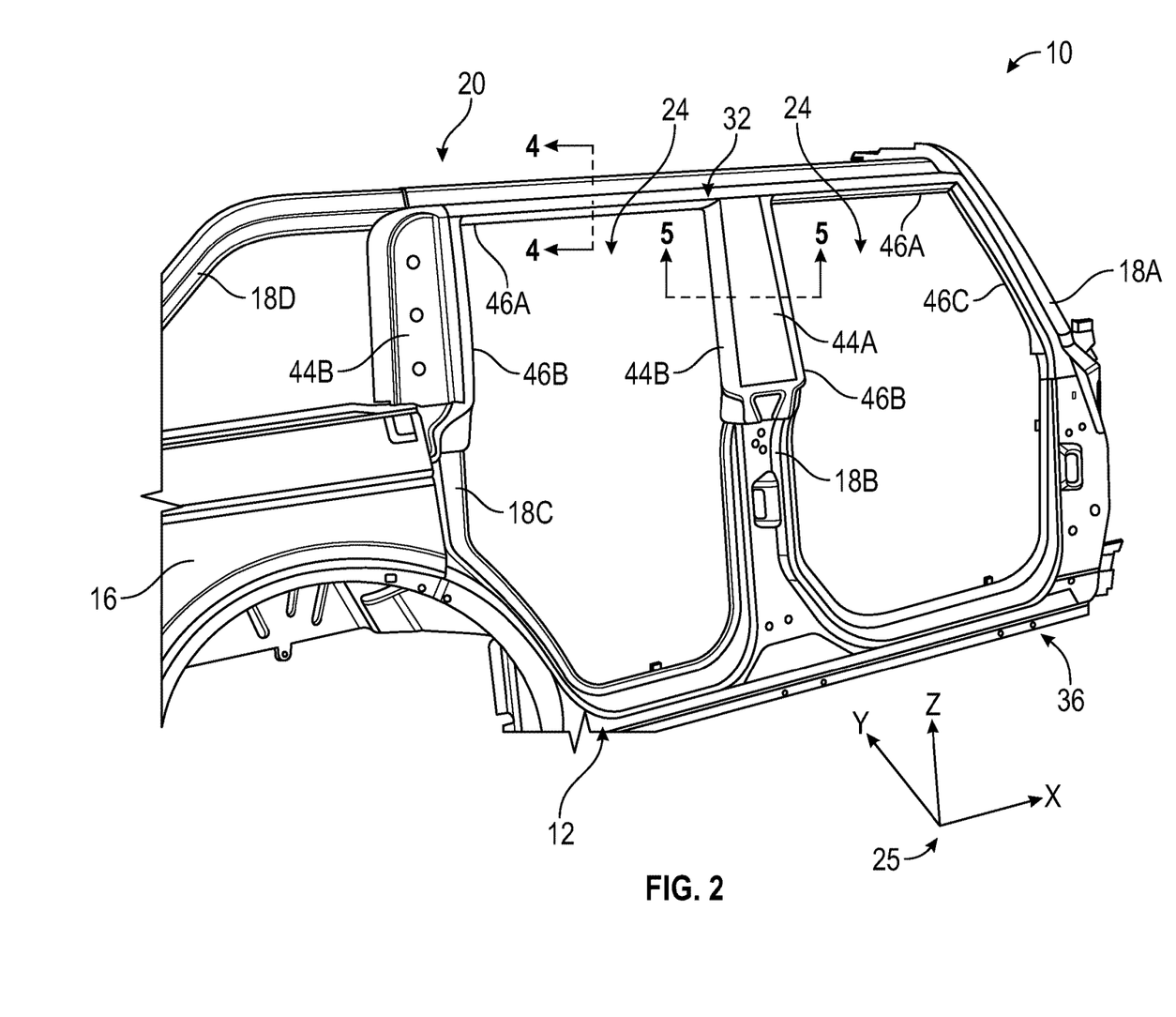
FIG. 2 is a passenger-side view of the vehicle of FIG. 1.

FIGS. 1 and 2 illustrate select portions of a vehicle 10. In an embodiment, the vehicle 10 is a sport utility vehicle (SUV). However, the vehicle 10 could alternatively be configured as a car, a truck, a van, or any other type of vehicle within the scope of this disclosure. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a vehicle body 12. The vehicle body 12 is shown relative to a three dimensional Cartesian coordinate system 25 that generally orients the vehicle 10 relative to X, Y, and Z axis directions. Axis line X generally represents an X-axis direction along a length of the vehicle 10, the axis line Y generally represents a Y-axis direction across a width of the vehicle 10, and the axis line Z generally represents a Z-axis direction along a height of the vehicle 10. Reference may be made periodically throughout this specification to the X-axis, the Y-axis, and the Z-axis directions. These directions coincide with the X, Y, and Z directions indicated by the Cartesian coordinate system 25 shown in FIGS. 1-2.

Among other vehicle body components, the vehicle body 12 may include two or more door assemblies 14, two or more side panels 16, a plurality of pillars 18, and a roof 20 supported by the pillars 18. In an embodiment, the vehicle 10 is a four-door vehicle and therefore includes A-pillars 18A, which are closest the front of the vehicle 10, D-pillars 18D, which are closest to the rear of the vehicle 10, and B-pillars 18B and C-pillars 18C, which are intermediate pillars disposed between the A-pillars 18A and the D-pillars 18D. However, the teachings of this disclosure are also applicable to two-door vehicles having one door assembly 14 located on both a driver side 34 and a passenger side 36 of the vehicle 10.

Unless stated otherwise in this disclosure, the use of a given reference numeral (e.g., 18, 44, 46, etc.) without any alphabetic identifier immediately following the reference numeral may refer to any of the components identified by that same reference number. For example, when used alone, the reference numeral "18" may refer to any of the pillars 18A, 18B, 18C, and 18D.

The door assemblies 14 may be utilized to enter and exit the vehicle 10. Each door assembly 14 of the vehicle 10 may include a frameless door 22 and a frameless window 24. The frameless doors 22 and the frameless windows 24 are considered "frameless" in that no structural door frame extends above a belt line 26 of the frameless doors 22 for guiding movement of a glass panes 28 of the frameless windows 24.

Each glass pane 28 is vertically movable along the Z-axis between an open position (shown in phantom) in which the glass pane 28 is received within an interior cavity 30 of the frameless door 22 and a full-up or closed position in which the glass pane 28 is moved into sealing engagement with an adjustable glass track system 32 to close the frameless window 24. As discussed in greater detail below, the adjustable glass track system 32 is configured to establish a continuous seal plane about a periphery of the glass pane 28 when the glass pane 28 is moved to the closed position.

In an embodiment, the vehicle body 12 is equipped with two adjustable glass track systems 32, with one adjustable glass track system 32 being provided on both the driver side 34 (see FIG. 1) and the passenger side 36 (see FIG. 2) of the vehicle 10 for establishing a continuous sealing plane relative to each door assembly 14 of the vehicle body 12.

Figure 3:
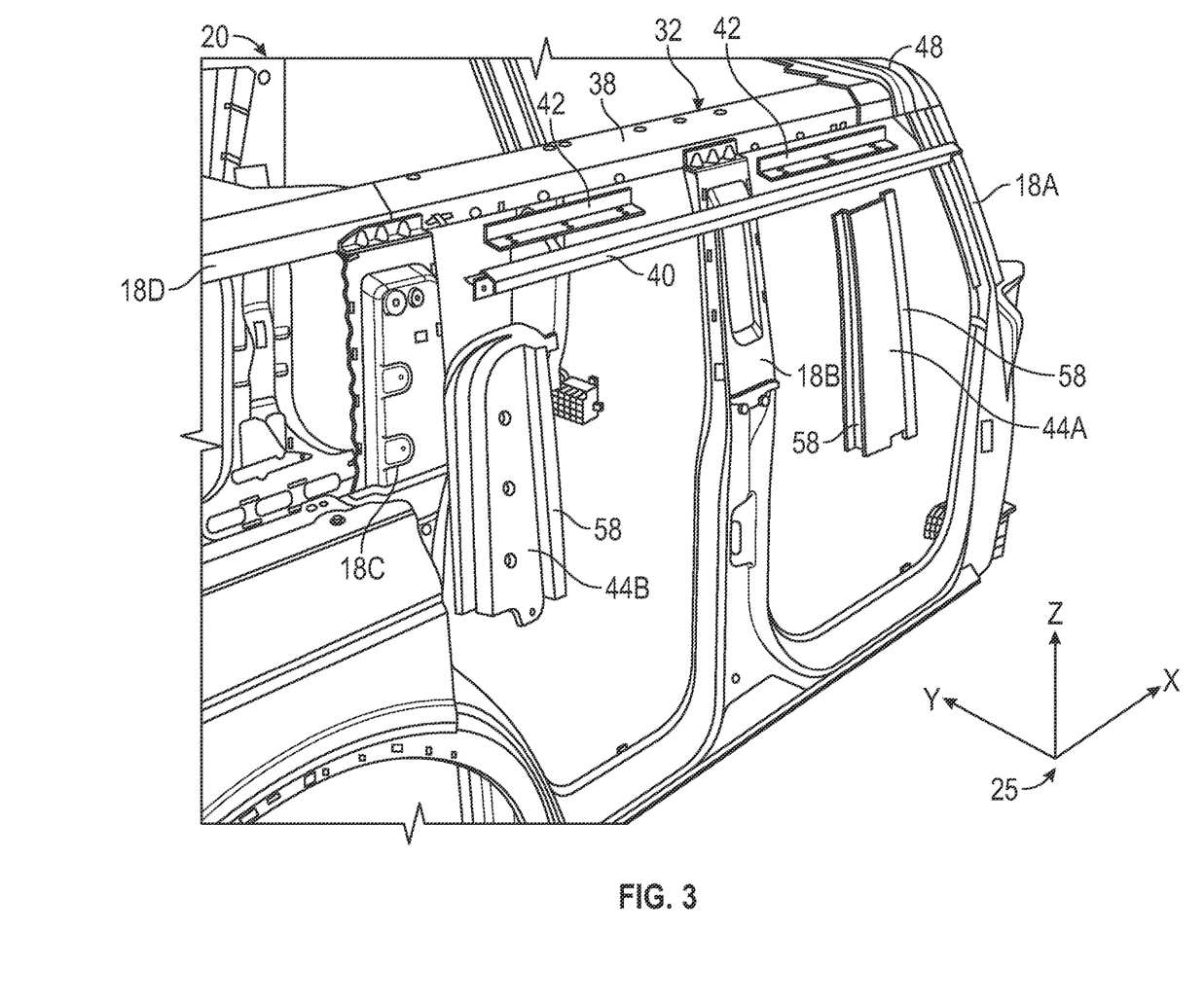
FIG. 3 is an exploded view of the adjustable glass track system shown in FIG. 2.
Figure 4:
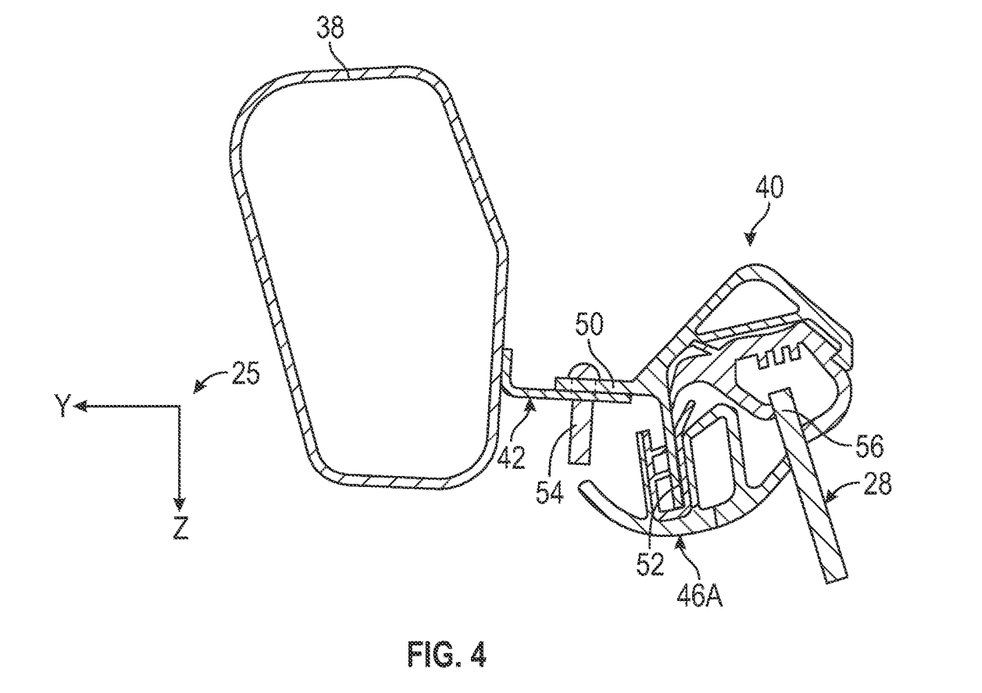
FIG. 4 is a cross-sectional view through section 4-4 of FIG. 2.
Figure 5:
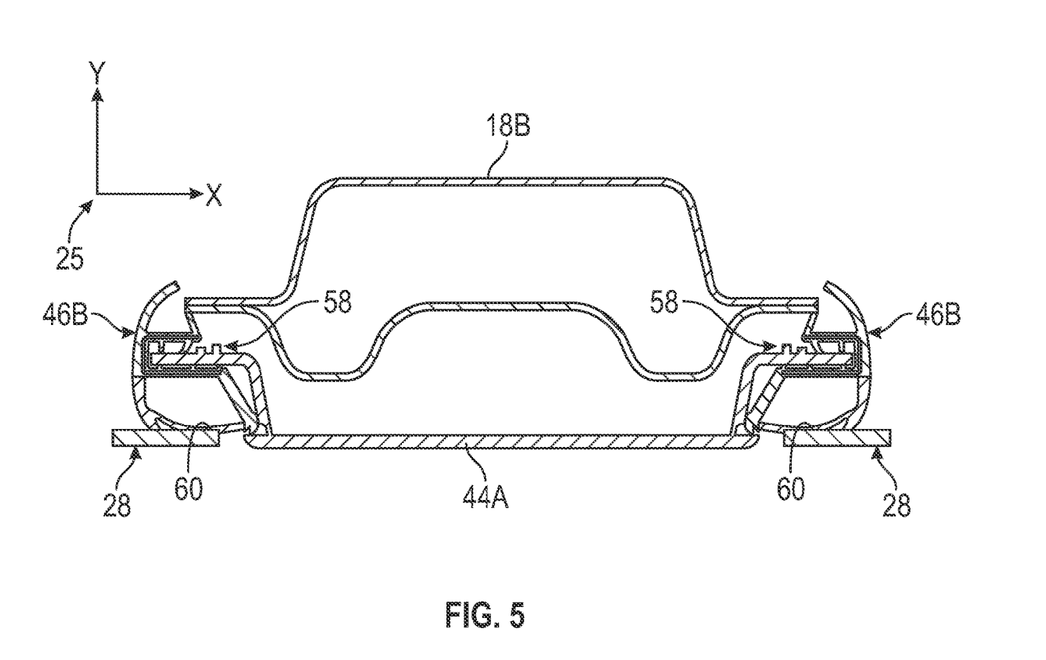
FIG. 5 is a cross-sectional view through section 5-5 of FIG. 2.

Referring now to FIGS. 3, 4, and 5, each adjustable glass track system 32 may include a tubular frame rail 38, a channel rail 40, one or more rail brackets 42, one or more appliques 44, and various seals 46. Each of these components and its respective function is described in detail below.

The tubular frame rail 38 is a structural member of the roof 20 and may extend longitudinally along the X-axis between a front header 48 of the roof 20 and the D-pillar 18D. The front header 48 may connect to the A-pillar 18A. The tubular frame rail 38 may sometimes be referred to as a sport tube or a roll bar of the roof 20. In an embodiment, the tubular frame rail 38 is a hydroformed, aluminum tube. In another embodiment, the tubular frame rail 38 is made of steel. However, other manufacturing techniques and any other high strength materials are further contemplated within the scope of this disclosure.

Because of its tubular design, the tubular frame rail 38 generally lacks channels or flanges for attaching sealing structures thereto. Accordingly, the channel rail 40 may be mounted to the tubular frame rail 38, via the rail brackets 42, for enabling the implementation of seals (see, e.g., first seal 46A of FIG. 4) between the A-pillar 18A and the B-Pillar 18B and between the B-pillar 18B and the C-pillar 18C. The channel rail 40 may extend longitudinally along the X-axis and in parallel with the tubular frame rail 38. In an embodiment, the channel rail 40 extends continuously from the A-pillar 18A to the C-pillar 18C of the vehicle body 12.

Referring primarily to FIG. 4, the channel rail 40 may include a first flange 50 and a second flange 52. The first flange 50 extends toward the tubular frame rail 38, such as generally along the Y-axis, and the second flange 52 extends downwardly in a direction toward the ground, such as generally along the Z-axis. The second flange 52 may therefore be referred to as a down standing flange.

The first flange 50 may provide a mounting surface for mounting the channel rail 40 to one or more of the rail brackets 42. In an embodiment, the first flange 50 is mounted directly to the rail bracket 42 by one or more locator pins 54 (e.g., by inserting the locator pins 54 through mounting holes formed in the first flange 50 and the rail bracket 42). The channel rail 40 may be adjusted in/out (e.g., along the Y-axis) and fore/aft (e.g., along the X-axis) by adjusting positioning of the locator pins 54 relative to the rail bracket 42.

In an embodiment, each rail bracket 42 is L-shaped. The rail brackets 42 may be mounted directly to the tubular frame rail 38, such as by welding or any other suitable fastening technique.

The second flange 52 may provide a mounting surface for receiving one or more first seals 46A. In a four-door embodiment, each adjustable glass track system 32 includes two of the first seals 46A, with one of the first seals 46A being disposed longitudinally between the A-pillar 18A and the B-pillar 18B, and a second of the first seals 46A being disposed longitudinally between the B-pillar 18B and the C-pillar 18C (see, for example, FIG. 2). The first seals 46A are configured to seal to a top peripheral edge 56 of the glass panes 28 when the glass panes 28 are moved to the closed positions.

Referring now primarily to FIGS. 2, 3, and 5, the appliques 44 may be mounted to the pillars 18 of the vehicle body 12. In a four-door embodiment, a first applique 44A is secured to the B-pillar 18B and a second applique 44B is secured to the C-pillar 18C. Each applique 44 may include one or more side flanges 58. In an embodiment, the applique 44B includes two side flanges 58, and the applique 44B includes one side flange 58. Each side flange 58 provides a mounting surface for receiving a second seal 46B. The second seals 46B may extend vertically (i.e., along the Z-axis) along the side flanges 58 and are configured for sealing to inner side peripheral edges 60 of the glass panes 28 when the glass panes 28 are moved to the closed positions. The advantage of mounting the second seals 46B directly to the appliques 44 is that the second seals 46B can adjust and follow the in/out position of the channel rail 40 for establishing a continuous seal around the periphery of the glass pane 28.

A third seal 46C (see FIG. 2) may be secured to the A-pillar 18A. The third seal 46 extends vertically along the A-pillar 18A and is configured for sealing to side peripheral edges of the glass panes 28 of front door assemblies 14. Together, the first seals 46A, the second seals 46B, and the third seals 46C establish continuous seal planes about the peripheries of the glass panes 28 of the door assemblies 14.

Figure 6A:
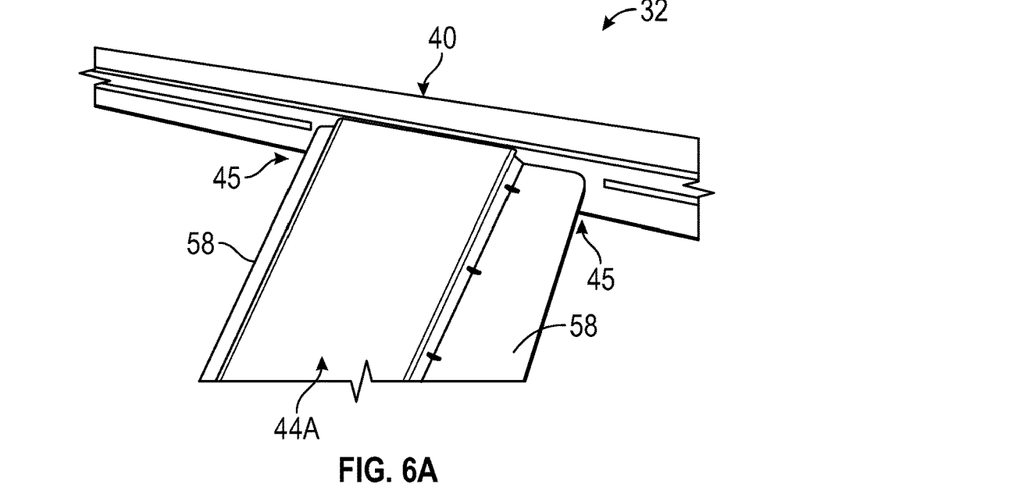
FIGS. 6A, 6B, and 6C illustrate features associated with connecting an applique to a channel rail of an adjustable glass track system.
Figure 6B:
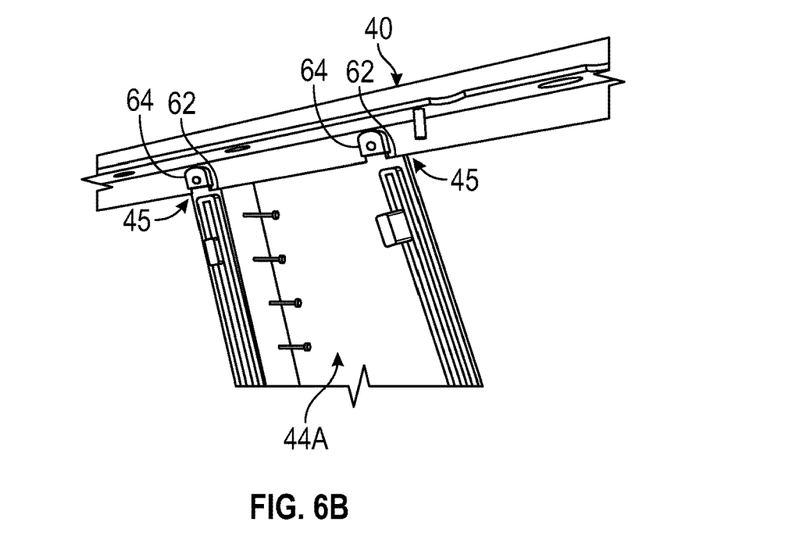
Figure 6C:
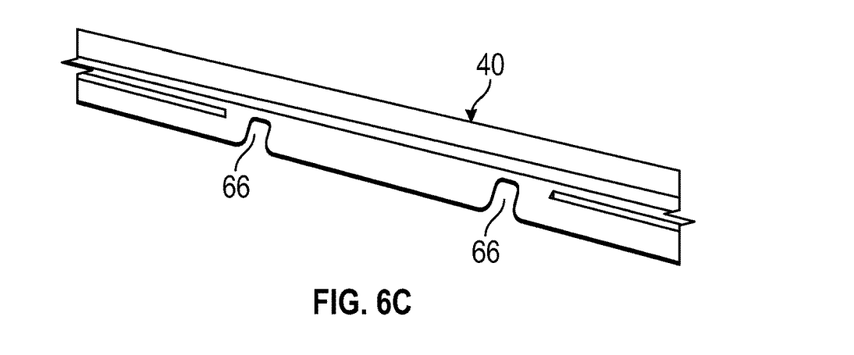

FIGS. 6A, 6B, and 6C illustrate additional features associated with the applique 44A of the adjustable glass track system 32. An upper edge 62 of each side flange 58 of the applique 44A may include a locating hook 64 (see FIG. 6B) for locating the applique 44A relative to the channel rail 40. The locating hooks 64 may be received by and secured within slots 66 (see FIG. 6C) formed in the channel rail 40. A direct relationship is therefore established between the channel rail 40 and the applique 44A. This direct relationship enables the elimination of joints between the first seals 46A and the second seals 46B, thereby reducing variations because the sealing plane can continue up the pillar 44A and around a corner 45 onto the channel rail 40.

Figure 7A:
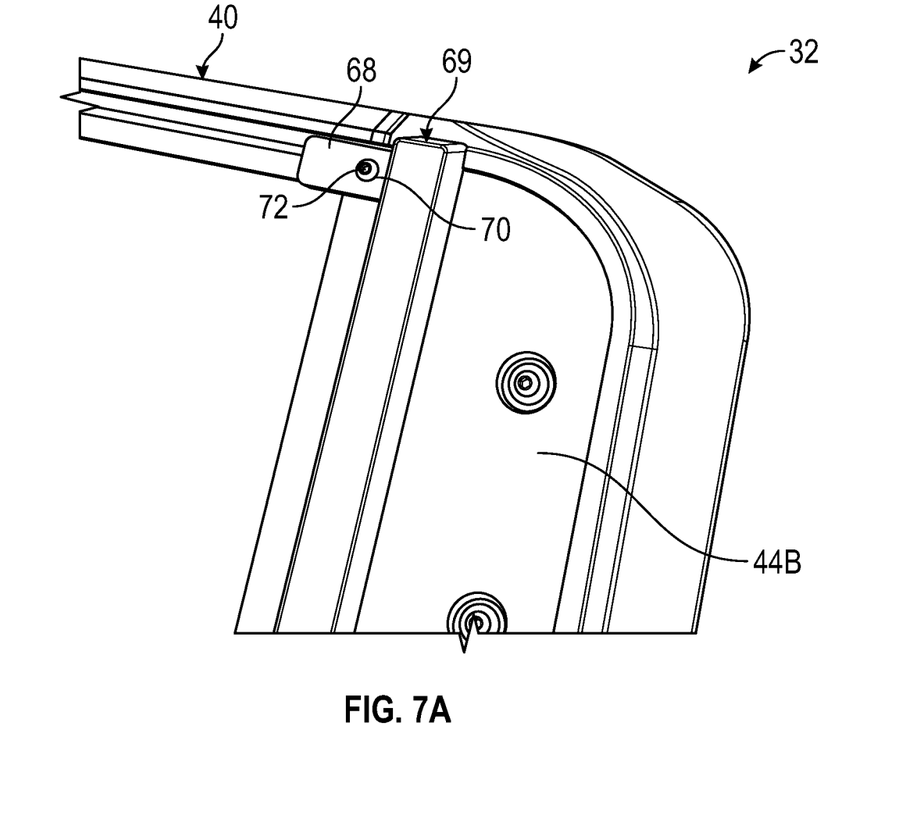
FIGS. 7A and 7B illustrate features associated with connecting another applique to a channel rail of an adjustable glass track system.
Figure 7B:
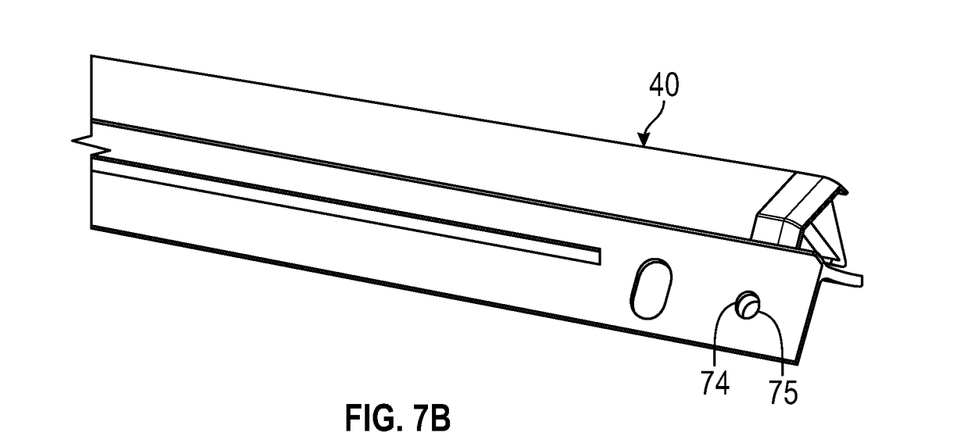

FIGS. 7A and 7B illustrate additional features associated with the applique 44B of the adjustable glass track system 32. The applique 44B may include a tab 68, located near an upper edge 69, for mounting the applique 44B to the channel rail 40. The tab 68 may include an opening 70 for receiving a fastener 72, such as a screw, for example. The fastener 72 may be received by a receiving nut 74 (see FIG. 7B) imbedded within an opening 75 of the channel rail 40 for securing the applique 44B to the channel rail 40.

Figure 8:
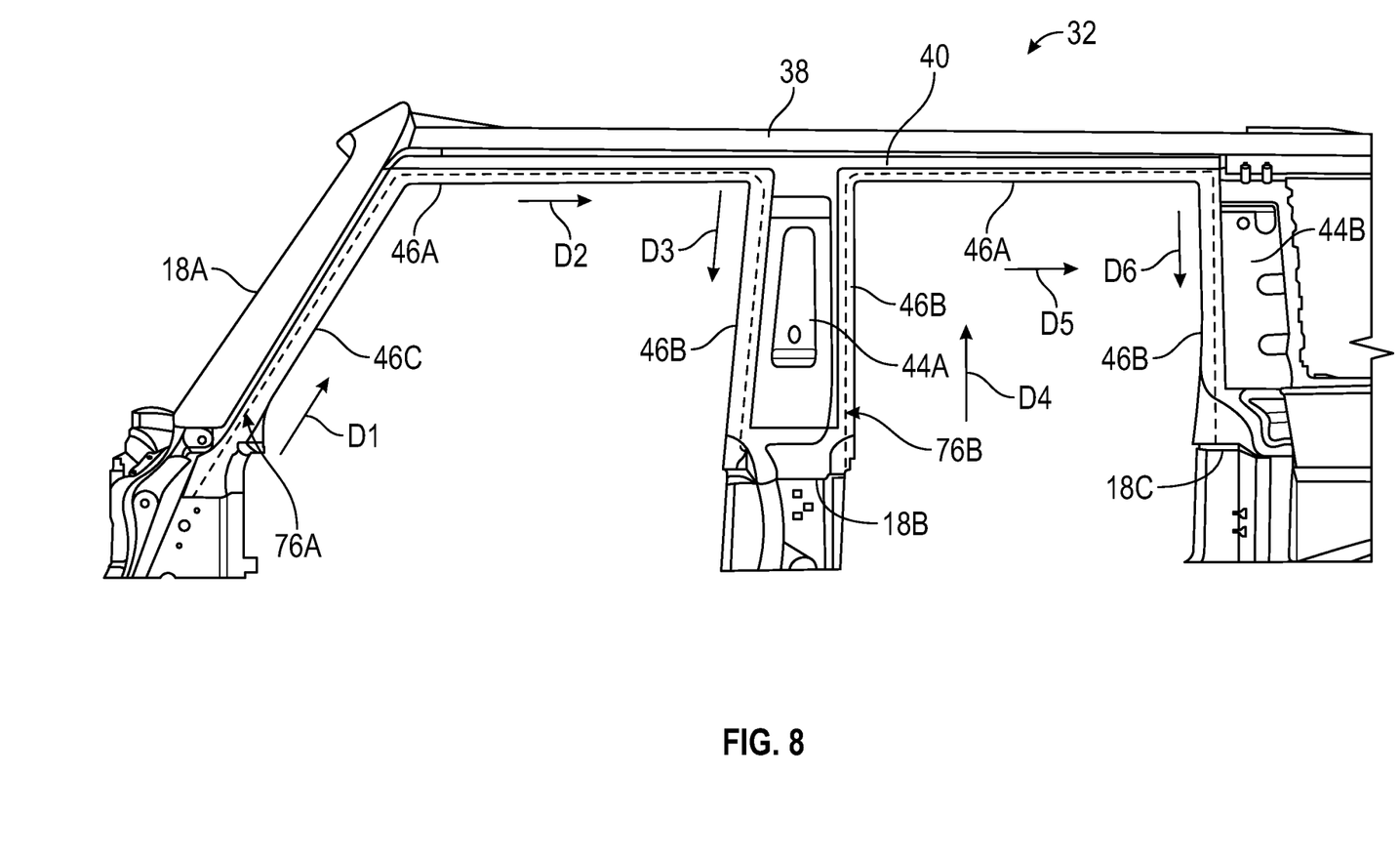
FIG. 8 illustrates a continuous seal plane established by an exemplary adjustable glass track system.

FIG. 8 illustrates continuous seal planes established by the seals 46A, 46B, and 46C of the adjustable glass track system 32. For a two-door embodiment, a continuous seal plane 76A may extend in a first direction D1 along the A-pillar 18A, then in a second direction D2 longitudinally along the channel rail 40, and then in a third direction D3 along the applique 44A. For a four-door embodiment, the continuous seal plane 76A may extend along the first, second, and third directions D1, D2, and D3 for sealing relative to the glass pane of a front door assembly, and a second continuous seal plane 76B may extend in a fourth direction D4 along an opposite side of the applique 44A, then in a fifth direction D5 longitudinally along the channel rail 40, and then in sixth direction along the applique 44B for sealing relative to a glass pane of a rear door assembly.

In the embodiments discussed above, the adjustable glass track systems 32 are described and illustrated in the context of establishing continuous seal planes about the periphery of movable glass panes of frameless doors. The adjustable glass track system 32 may further be configured for establishing additional seal planes relative to roof structures of the vehicle 10.

Figure 9:
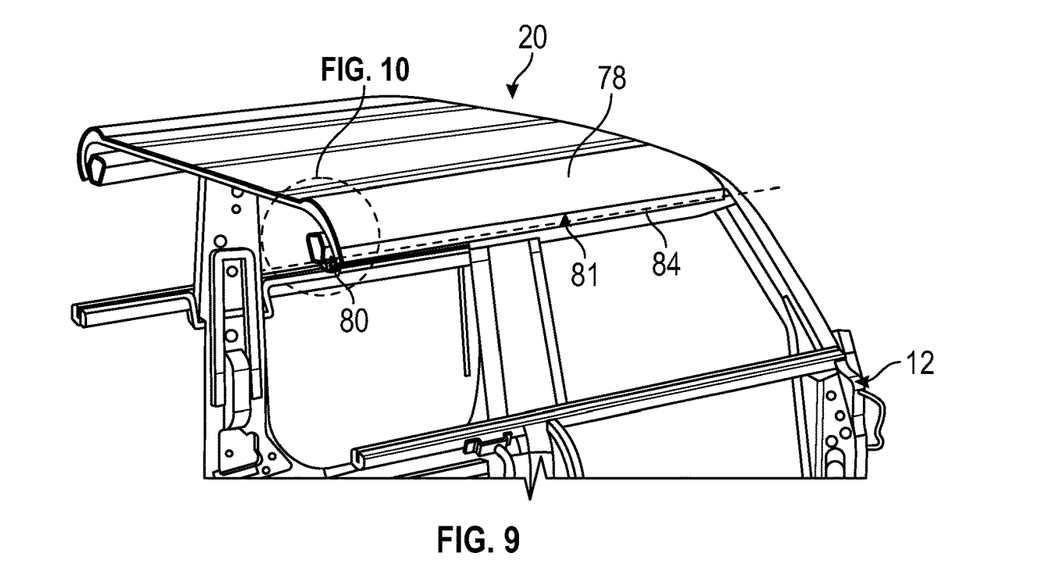
FIG. 9 illustrates another continuous seal plane established by an exemplary adjustable glass track system.
Figure 10:
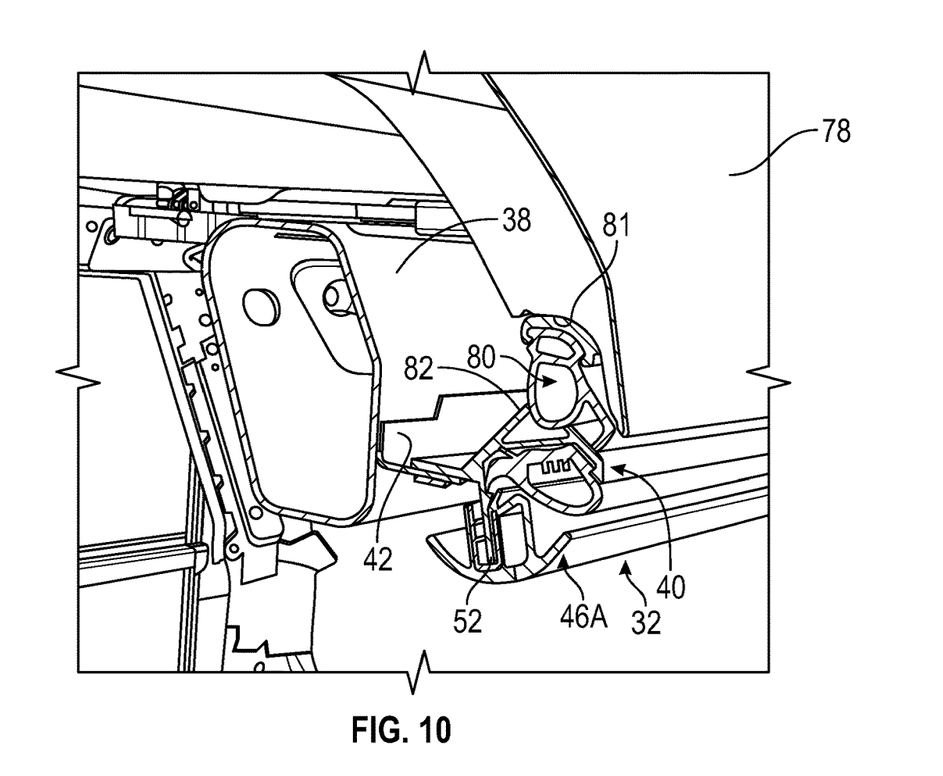
FIG. 10 is a blown-up view of select portions of FIG. 9.

For example, as illustrated in FIGS. 9 and 10, the roof 20 of the vehicle body 12 of the vehicle 10 may include a removable roof structure 78. The removable roof structure 78 may be configured as either a hard top roof structure or a soft top roof structure. A roof seal 80 may be provided along an inner peripheral edge 81 of the removable roof structure 78.

As best illustrated in FIG. 10, the roof seal 80 may engage an upper surface 82 of the channel rail 40 of the adjustable glass track system 32. The upper surface 82 may be positioned on an opposite side of the channel rail 40 from the second flange 52 (i.e., the flange that receives the first seal 46A for sealing relative to frameless door glass panes). The channel rail 40 therefore provides the necessary surface for establishing a continuous seal plane 84 (see FIG. 9) relative to the inner peripheral edge 81 of the removable roof structure 78.

The adjustable glass track systems of this disclosure provide an adjustable rail and applique assembly that is separate from the vehicle body for sealing multiple vehicle components (e.g., side door glass panes, roof structures (hard or soft top), etc.). The exemplary glass track systems connect roof and vertical pillars to provide continuous and adjustable sealing planes around door glass panes and further provide roof structure sealing that is partitioned from the glass pane sealing.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An adjustable glass track system for a vehicle, comprising:
   a tubular frame rail of a roof of the vehicle;
   a channel rail mounted relative to the tubular frame rail;
   a first seal secured to the channel rail;
   an applique secured to the channel rail;
   a second seal mounted to the applique; and
   a glass pane of a door assembly having a frameless door,
   wherein the first seal is configured to seal relative to a top peripheral edge of the glass pane, and the second seal is configured to seal relative to an inner side peripheral edge of the glass pane.

2. The system as recited in claim 1, wherein the tubular frame rail is a hydroformed aluminum tube.

3. The system as recited in claim 1, wherein the channel rail is mounted to the tubular frame rail by a rail bracket.

4. The system as recited in claim 3, wherein the channel rail includes a first flange mounted to the rail bracket by a locator pin and a second flange that receives the first seal.

5. The system as recited in claim 1, wherein the applique includes a side flange that receives the second seal.

6. The system as recited in claim 1, wherein the applique includes a locating hook received within a slot formed in the channel rail.

7. The system as recited in claim 1, wherein the applique is mounted to the channel rail by a fastener.

8. The system as recited in claim 1, wherein the channel rail extends between a first pillar and a second pillar, and further comprising a third seal mounted to the first pillar.

9. The system as recited in claim 1, wherein the first seal and the second seal meet together at a corner between the channel rail and the applique to establish a continuous seal plane that follows a path around the corner.

10. A vehicle, comprising:
    a door assembly including a frameless door and a frameless window,
    wherein a glass pane of the frameless window is movable between an open position in which the glass pane is positioned inside an interior cavity of the frameless door and a closed position in which the glass pane extends outside of the interior cavity; and
    an adjustable glass track system configured to establish a continuous seal plane about a periphery of the glass pane when the glass pane is in the closed position.

11. The vehicle as recited in claim 10, wherein the door assembly is a front door assembly or a rear door assembly of the vehicle.

12. The vehicle as recited in claim 10, wherein the adjustable glass track system includes:
    a tubular frame rail;
    a channel rail mounted to the tubular frame rail by a rail bracket;
    a first seal secured to the channel rail;
    a first applique secured to the channel rail; and
    a second seal mounted to the first applique.

13. The vehicle as recited in claim 12, wherein the first applique is mounted to a first pillar of the vehicle, and comprising a second applique mounted to a second pillar of the vehicle, and further comprising a second, second seal mounted to the second applique.

14. The vehicle as recited in claim 13, wherein the first seal extends between the first pillar and the second pillar, and comprising a second, first seal extending between the second pillar and a third pillar.

15. The vehicle as recited in claim 14, comprising a third seal mounted to the third pillar.

16. The vehicle as recited in claim 13, wherein, together, the first seal, the second seal, and the second, second seal establish the continuous seal plane.

17. The vehicle as recited in claim 12, wherein the channel rail includes a first flange mounted to the rail bracket by a locator pin and a second flange that receives the first seal, and further wherein the first applique includes a side flange that receives the second seal.

18. The vehicle as recited in claim 10, wherein the adjustable glass track system is configured to establish a second seal plane relative to an inner peripheral edge of a removable roof structure, and further wherein the removable roof structure is a soft top roof structure or a hard top roof structure.

19. The vehicle as recited in claim 12, wherein a position of the channel rail relative to the tubular frame rail is adjustable via one or more locator pins that are removably insertable through a first flange of the channel rail and the rail bracket.

20. The system as recited in claim 1, wherein the first seal is secured to a down standing flange of the channel rail.

* * * * *